United States Patent [19]
Askari et al.

[11] Patent Number: 5,362,768
[45] Date of Patent: Nov. 8, 1994

[54] HYDROGEL MATERIAL

[75] Inventors: Syed H. Askari, Sunnyvale; Shao C. Jeang, Cupertino; Herman H. Neidlinger, San Jose, all of Calif.

[73] Assignee: Pilkington Visioncare, Inc., Menlo Park, Calif.

[21] Appl. No.: 107,023

[22] Filed: Jul. 30, 1993

Related U.S. Application Data

[63] Continuation of Ser. No. 641,273, Jan. 15, 1991, abandoned.

[51] Int. Cl.$^5$ .................. C08F 246/00; C08F 220/24; G02B 1/04
[52] U.S. Cl. ..................... 523/106; 523/107; 524/544; 524/547; 524/548; 524/549; 524/916; 351/160 H; 526/245
[58] Field of Search ............... 523/106, 107; 524/544, 524/547, 548, 549, 916; 351/160 HV

[56] References Cited

U.S. PATENT DOCUMENTS

| | | | |
|---|---|---|---|
| 4,272,422 | 6/1981 | Tanaka | 524/547 |
| 4,578,504 | 3/1986 | Hammar et al. | 556/437 |
| 4,594,401 | 6/1986 | Takahashi et al. | 523/107 |
| 4,638,040 | 1/1987 | Hammar et al. | 526/245 |
| 4,820,747 | 4/1989 | Chen | 523/107 |
| 4,921,884 | 5/1990 | Hammer et al. | 523/106 |

FOREIGN PATENT DOCUMENTS

| | | | |
|---|---|---|---|
| 128701 | 12/1984 | European Pat. Off. | 523/106 |
| 294515 | 12/1988 | European Pat. Off. | 523/108 |
| 294976 | 12/1988 | European Pat. Off. | 523/106 |

OTHER PUBLICATIONS

Derwent Abstract 91-924932/04, Basic Abstracts Journal, Section CH, Week 9104 27 Mar., 1991, Derwent Publications, Ltd., London, GB; Class A, p. 368.

*Primary Examiner*—Paul R. Michl
*Assistant Examiner*—Andrew E. C. Merriam
*Attorney, Agent, or Firm*—Burns, Doane, Swecker & Mathis

[57] ABSTRACT

A polymeric composition suitable for use in ophthalmic devices such as contact lenses, intraocular lenses and other medical and non-medical devices which composition comprises a copolymer that incorporates repeating units containing a solvolyzable group and various desired hydrophilic repeating units in predetermined ratios, which copolymer is mechanically stable and upon hydration the dimensions of polymeric articles which as formed therefrom can be controlled. In particular, the hydrophilic compositions resulting from the invention are user in applications where stresses and distortions of the polymer article due to water absorption etc. must be minimized or, if possible, eliminated.

17 Claims, 1 Drawing Sheet 5,362,768

HYDROGEL MATERIAL

This application is a continuation of U.S. application Ser. No. 07/641,273, filed Jan. 15, 1991 now abandoned.

FIELD OF INVENTION

This invention relates to polymer articles and to controlling dimensional changes in such articles, for example, ophthalmic devices act other suitable medical and non-medical devices. In particular this invention relates to polymer articles in which at least a portion of the article is formed from copolymers containing solvolyzable bulky leaving groups, which copolymers upon solvolysis and hydration yield a hydrogel with a controllable dimensional change on removal of the leaving groups. In return, this enables the minimisation of the stresses and deformations in the polymer article during, and resulting from, hydration.

In a second aspect, this invention relates to soft contact lenses and includes lenses having a relatively harder oxygen permeable center portion and a soft hydrophilic peripheral skirt Formed From the hydrogels of the present invention.

BACKGROUND OF THE INVENTION

Hydrogels are polymeric materials which are used in the manufacture of medical devices such as soft contact lenses, intraocular lenses, etc. These polymers expand considerably from their xerogel state during hydration. The change in total volume of a polymer article made from the copolymer during water absorption (hydration) depends on the nature and hydrophilicity of the monomers/polymers of the copolymer.

In the manufacture of articles requiring exact parameters, such as contact lenses and intraocular lenses, the swelling of the article during hydration can become a serious problem. This is because accurate production requires reasonably precise predictability of the dimensional swelling in order to set the manufacturing parameters. Also the swelling produces distortions and stresses in the hydrated polymer matrix, and hence the article.

In fact, substantial residual stresses and the resulting distortions can make the material unacceptable for its intended use.

In the production of contact lenses, etc., it is unusual to shape the product to its final form from the hydrated hydrogel due to production difficulties. In fact, it is simpler to machine or cast the product the xerogel state. Now, as the article is to be used in a hydrated state, the swelling during hydration of the polymer must also be accounted for in considering the dimensions of an article which is to be produced from the polymer in the non-hydrated or xerogel state.

Further if there are any variations in the degree of swelling from batch to batch or within a batch of material, the product will not be manufactured to the desired final dimensions. This may happen in the absence of changes in total water uptake if the ratio of the extent of swelling in the x, y or z directions changes in a fashion which compensates for the total volume increase.

Also at times there is a definite need to prepare materials from hydrogels that do not show any change in the volume during hydration. For example, U.S. Pat. No. 4,093,361 describes the preparation of a hydrogel with no net swelling during hydration. In this case the monomer was polymerized in the presence of a non-reactive water soluble neutral filler material. After polymerization was complete the neutral filler was washed out with a solvent, thereby leaving the final dimensions of the hydrogels articles unchanged. However, polymers made in this way suffer the disadvantage that parameters such as hardness become unsatisfactory and the mechanical properties (e.g. modulus, tear strength, max. elongation) of the resulting product are no longer optimum.

Furthermore, there can be a need to change the surface characteristics of hydrogels through surface treatments of the polymer in the xerogel state. Substantial volume changes in the hydrogel duping hydration can render these surface modifications useless due to the development of cracks and fissures in the surface.

SUMMARY OF THE INVENTION

It is an object of the present invention to provide polymer articles constructed at least in part from a co-polymer material which contains solvolyzable bulky leaving groups, and which yields after solvolysis and hydration, hydrogels which have undergone a selected and controlled volume change.

Preferred solvolyzable polymers are made from acrylate, methacrylate and vinyl monomers incorporating large leaving groups such as trifluoroacetyl, trichloroacetyl, trimethylsilyl and the like.

The co-polymer articles of the present invention exhibit controlled dimensional changes after polymerization and hydration which enables substantial stress and distortion in articles made therefrom to be avoided.

A further objective of the present invention is to provide contact lens made in whole, or in part, from novel polymer compositions which are soft and hydrophilic in nature and which after hydration exhibit excellent properties including high strength, no deterioration with time, relatively slow release of hydrated water upon exposure to air, good optical characteristics and which can be easily formed into contact lenses.

The present invention provides a polymer article at least a portion of which comprises a hydrogel containing water in the range from 5 to 95% by weight, which hydrogel is formed from a co-polymer which can be solvolyzed and hydrated to form the hydrogel, and which during treatment undergoes a volume change of between a shrinkage off 20% and an expansion off 40% which volume change is dictated by the monomer composition of the co-polymer, the co-polymer being formed from two or more monomers of a first group I, which contains two or more monomers, said monomers each having one or more substituable leaving groups which can be removed from the co-polymer by solvolysis, and one or more monomers of a second group II, containing one or more ethylenically unsaturated monomers without such substituable leaving groups, the quantity by weight of each group present in the co-polymer being chosen so that the first group is in the range 5 to 95% by weight of the co-polymer, and the second group 5 to 95% by weight of the copolymer.

DETAILED DESCRIPTION OF THE INVENTION

Figure 1:
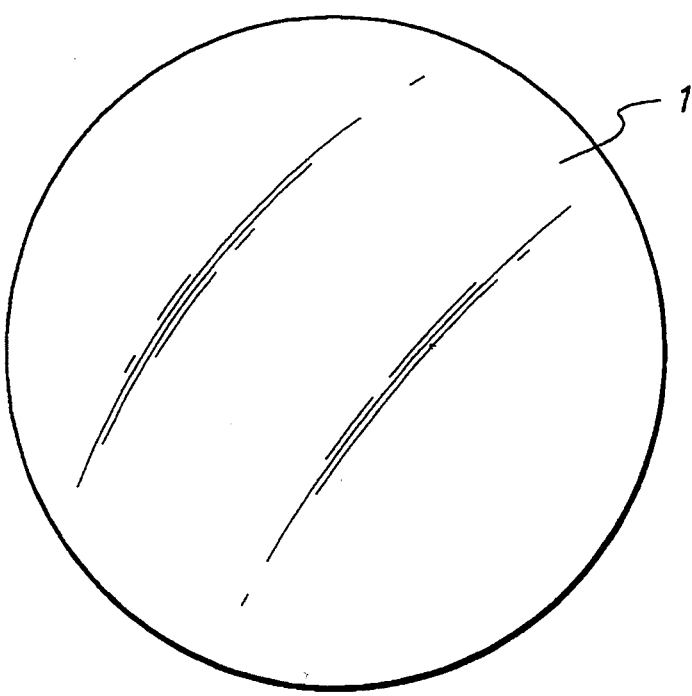
FIGS. 1 and 2 illustrate first and second types of contact lenses made using the polymer composition described herein.

As used in this application "solvolyzable" means an ester linking group capable of cleaving into a carboxy containing compound for example, amide, ester or acid and an alcohol in the presence of a nucleophile, for example, water or a weak base, For example, ammonia or organic amine or the presence of a lower $C_1$ to $C_4$ alcohol.

We prefer to form the polymer articles of the invention at least partially from a co-polymer in which the monomers of the first group are selected from monomers of the general formula shown below:

$$CH_2=C(R^1)-Y-R_x{}^L$$

where $R^1=$ —H, —alkyl and —substituted alkyl groups, $R_x{}^L$;

$Y=$ —$(CH_2)_k$—, —(Ar)— or —substituted (Ar)—, —$COO(CP_2)_l$—$(CR^2R^3)_m$—$(CP_2)_n$—, where Ar is an aromatic group;

$P=$ —H, —alkyl and —substituted alkyl groups, halo (chloro, bromo, iodo) groups, —(Art) or —substituted (Ar);

$R^2R^3=$ —H, —$CH_2$—, or

—$OCO(CP_2)_j$—$CH_3$;

$R_x{}^L=$ —$OCOCF_3$, —$OCOCCl_3$, —$OCOCBr_3$, —O—$Si[(CP_2)_k$—$CP_3]_3$,

—$OSO_3$—$CH_3$, —$OSO_3$—Ar—$CH_3$;

k=0–16, preferred values for k are 0–6;

j, m, n are 0 or an integer between 1 and 16 with the proviso that j+m+n=2–16; preferred values for j, m, n are 0–6.

The synthesis of monomers with k, j, m, n>16 results in hydrogels with undesirable properties. Further, x is functionally dependent on Y; for example when Y is difunctional [—$CH_2$—], x=1; when Y is trifunctional aromatic (At), x=2.

Other suitable monomers of the first group which can be suitably modified by solvolysis, in these cases to give alcohols or diols, include monomers which include the following groups:

Chloroacetyl, dichloroacetyl, trichloroacetyl, fluoroacetyl, methoxyacetyl, triphenylmethoxyacetyl, phenoxyacetyl, silyl ethers such as trimethysilyl, triethylsilyl, isopropyldimethylsilyl, t-butyldimethylsilyl, methyldiisopropylsilyl, tribenzylsilyl, triphenylsilyl, cyclic acetals and ketals incorporating methylene, ethyledene, 2,2,2-trichloroethyledene groups; cyclic orthoesters formed from methoxy methylene, ethoxymethylene, 1-(N,N-dimethylamino)ethyledene derivatives, 1-(N,N-dimethylamino)benzylidene derivatives, and methanesulfonate and toluenesulfonates.

The preferred monomers of the first group may be produced by the synthesis shown below by the reaction schemes:

1] 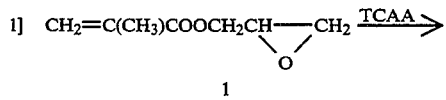

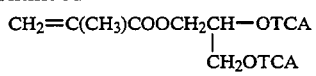

2

The trichloroacetate ester of glyceryl methacrylate (HCE-GMA(2)), a colorless viscous liquid, is prepared by the reaction of glycidyl methacrylate (1) with an equivalent of trichloroacetic anhydride (TCAA).

2] 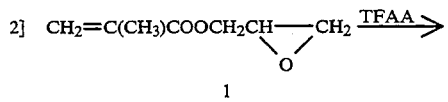

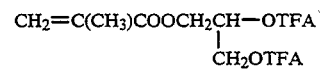

3

The trifluoroacetate derivative of glyceryl methacrylate (HFE-GMA(3)) can be synthesized using trifluoroacetic anhydride.

3] 

$$CH_2=C(CH_3)COOCH_2-CH_2OTFA$$

5

4] 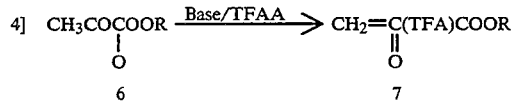

Trifluoroacetate derivative of hydroxyethyl methacrylate (TFA-HEMA, (5)) or trifluoroacetate derivative of hydroxy methacrylate (7) can be synthesized by the reaction of pyridine with hydroxyethyl methacrylate (4) or methyl pyruvate (6) and trapping the corresponding anion with trifluoroacetic arthydride [TFAA].

Now, in a particular example of the present invention, the co-polymerization of HCE-GMA and/or HFE-GMA with methyl methacrylate (MMA) and a suitable cross-linking agent, for example, ethylene glycol dimethacrylate produces a co-polymer or xerogel which on removal of the leaving groups by solvolysis and subsequent hydration yields a hydrogel.

The dimensions of an article made from the hydrogel, as compared to that of an article made from the xerogel, as will be appreciated by those skilled in the art, are dependent on the ratio of components of the copolymer, as well as the material components of the copolymer of the hydrogel.

In particular, with copolymers of HFE-GMA and HCE-GMA and MMA the final dimensions of the hydrated article were found to be dependent on the weight ratio of HCE-GMA to HFE-GMA at constant MMA concentration. For example, a copolymer of a mixture of HCE-GMA/HFE-GMA in a ratio of 3:1 and MMA resulted in a hydrogel with substantially little change in dimensions from the xerogel to the hydrogel state. However, with the HCE-GMA/HFE-GMA in a ratio by weight of 1:3 (and not 3:1) the change in dimensions of the article can be up to 11%. The monomer of the second group (II) may include any one or more of the following monomer materials Methyl Methacrylate (MMA)
Trifluoromethyl methacrylate (TFMMA)
Hydroxymethyl methacrylate (HMMA)
Trifluoroethyl methacrylate (TFEMA)
Hydroxyethyl methacrylate (HEMA)
Dimethyl acrylamide (DMA)

Contact lenses may be made by machining lens blanks made by cutting small cylinders or buttons from pods of the co-polymer before conversion from the xerogel to the hydrogel form.

The monomers may be co-polymerized with ethylene glycol dimethacrylate (EGMA) as the cross linking agent in the presence of t-butyl peroxy pivalate (TBPP) as the initiator in silylated glass tubes. After the reaction is complete, the glass tubes are broken to provide the xerogel in the form of colorless hard rods which are then cut into buttons which in turn are shaped into contact lenses on a lathe. The finished lenses are solvolyzed in 5% aqueous ammonia for 24–48 h and then allowed to equilibrate in saline solution for 24 hours.

Contact lens with a soft peripheral skirt and relatively harder center may be made by forming a rod as above with a size equal to the outside diameter of a lens and then drilling a hole through the center of the rod equal to the diameter of the central portion of the desired lens. This hole is then filled with a polymerizable material which forms a harder non-hydrophilic polymer.

By choosing a xerogel with little or no change in dimensions on hydration to form the hydrophilic skirts, any stresses or distortions which might occur if there was a substantial change in dimensions on hydration are eliminated. In other cases it may be desirable to use materials with matched expansions or shrinkage at values varying between a shrinkage of 20% and an expansion of 40%.

The present invention will be further illustrated by the examples which are provided for purposes of illustrations only and are not intended to be limiting of the present invention.

EXAMPLE 1

A mixture of (HCE-GMA:HFE-GMA) 3:1 ratio by weight and MMA with EGDMA crosslinker was prepared and the mixture was stirred for 30 min. After degassing the mixture for 30 seconds in bubbling Argon, TBPP was added. The mixture was transferred to a silylated glass tube and polymerized in a water bath maintained at 50° C. for 48 h. The partially polymerized material was transferred to an oven maintained at 70° C. and allowed to cure for 24 h. The polymer was allowed to cool slowly in the oven till it reached room temperature. The glass tubes were broken and the colorless transparent polymer was removed. Disks (0.2–0.5 mm in diameter) were cut from the material and hydrolyzed in aqueous $NH_4OH$ for 24 h. After equilibrating the disks in saline for another 24 h its linear expansion was measured. It was found that the disk expanded an average of 11% in diameter. The % hydration was 59%.

EXAMPLE 2

This reaction was repeated in exactly the same reaction conditions as before. However, this time (HCE-GMA:HFE-GMA 3:1) ratio by weight and MMA were polymerized at 50° C. and cured at 70° C. For 48 h in silylated glass tubes. After breaking the glass tubes, the material was isolated and disks were cut from the stress free, colorless, transparent and bubble free rods. These 0.2–0.5 mm thick disks were hydrolyzed in 5% $NH_4OH$ solution for 24 h. Later they were transferred to a saline solution and allowed to equilibrate for 24–28 h. Their expansions were measured upon hydration. It was found that the disk expanded an average of 1—2% in diameter. The % hydration was 8%.

EXAMPLE 3

This reaction was repeated in exactly the same reaction conditions as before. However, this time (HCE-GMA:HFE-GMA 10:1) ratio by weight and MMA/GMA were polymerized at 50° C. and cured at 70° C. for 48 h in silylated glass tubes. After breaking the glass tubes material was isolated and disks were cut from the stress free, colorless, transparent and bubble free rods. These 0.2–0.5 mm thick disks were hydrolyzed in 5% $NH_4OH$ solution for 24 h. Later they were transferred to a saline solution and allowed to equiliberate for 24–28 h. Their expansions were measured upon hydration. It was found that the disk expanded an average of 12–14% in diameter. The % hydration was 40%.

EXAMPLES 4–19

In the case of examples 4 to 19, the polymerization was carried out at 50° C. For 24 hours and curing at 70° C. For 48 hours. The reaction mixture contained monomer ratios shown in the accompanying table. The polymerization was carried out in silylated glass tubes, and after completion of polymerization, the tubes were broken to extract the finished rods. These were cut into disks and the solvolysis and hydration was carried out by immersing the disks in 5% $NH_4OH$ for 24 hours, followed by transfer to a saline solution and equilibration for 24 hours. The change in dimensions was measured upon hydration. The expansion is given in the table below:

| Monomers (Group I) | Composition | Comonomer | % Expansion |
| --- | --- | --- | --- |
| 4. HCE—GMA/HFE—GMA | 3:1 | MMA | 0–1% |
| 5. HCE—GMA/HFE—GMA | 3:1 | TFEMA | 0–1% |
| 6. HCE—GMA/HFE—GMA | 2:1 | MMA | 2–4% |
| 7. HCE—GMA/HFE—GMA | 1:1 | MMA | 4–6% |
| 8. HCE—GMA/HFE—GMA | 19:1 | MMA/GMA | 12–14% |
| 9. HCE—GMA/HFE—GMA | 19:1 | MMA/DMA | 6% |
| 10. HCE—GMA/HFE—GMA | 3:1 | MMA/TFEMA | 0–1% |
| 11. HCE—GMA/HFE—GMA | 3:1 | HMMA | 8% |
| 12. HCE—GMA/HFE—GMA | 3:1 | TFMMA | 0–1% |
| 13. HCE—GMA/TFA—MA | 3:1 | MMA | 4% |
| 14. HCE—GMA/TFA—MA | 3:1 | HMMA | 8% |
| 15. TFA—HEMA/TFAMA* | 3:1 | MMA | 7% |
| 16. TFA—HEMA/TFAMA | 3:1 | MMA/TFEMA | 6% |
| 17. TCA—HEMA/TFAMA | 3:1 | MMA/TFEMA | 4% |
| 18. TMS—GMC**/HFE—GMA | 3:1 | MMA | 0–1% |

| Monomers (Group I) | Composition | Comonomer | % Expansion |
|---|---|---|---|
| 19. TBDMS—GMA***/HFE—GMA | 1:0 | MMA | −20% |

*TFAMA = α-trifluoroacetyl methacrylate
**TMS—GMA = trimethylsiloxy glyceryl methacrylate
***TBDMS—GMA = t-butyldimethylsiloxy glyceryl methacrylate Now, referring to FIG. 1 of the accompanying drawings there is shown a first type of contact lens made in accordance with the present invention. The contact lens 1 comprises a solid section of one of the compositions listed in examples 1 to 17 listed above.

Figure 2:
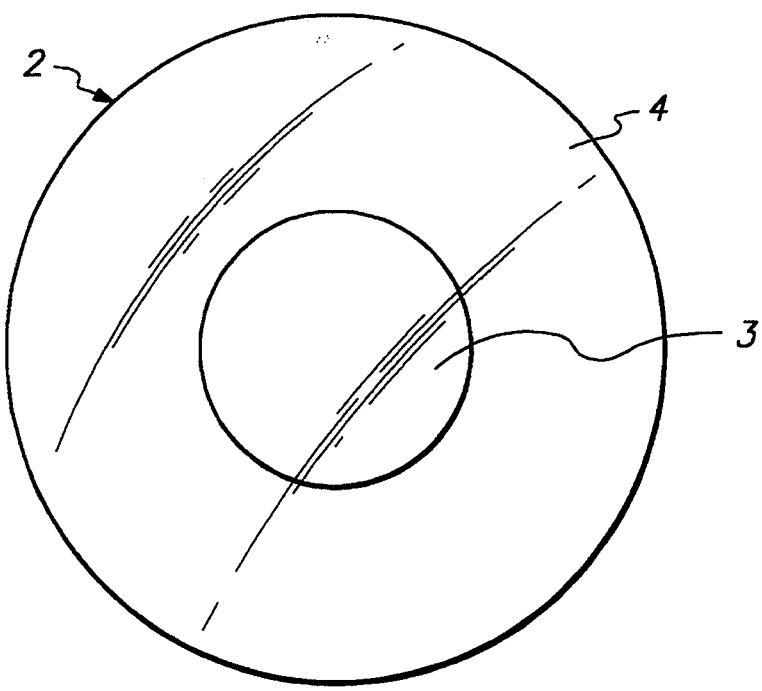

Now referring to FIG. 2 of the accompanying drawings there is shown a second type of contact lens made in accordance with the present invention. The contact lens 2 comprises a central section 3 made from a standard rigid gas permeable contact lens material, for example Fluoroboro 60, and an outer section 4 which surrounds the central section 3 and is made from HCE-GMA/HFE-GMA(3:1):MMA as per 4 above.

We claim:

1. A soft contact lens comprising a polymer at least a portion of which comprises a hydrogel which has a cross-linked structure and which contains water in the range of from 5 to 95% by weight, which hydrogel is formed by the process which comprises:

selecting two or more monomers from a first group I, said monomers having an ethylenically unsaturated group and each of said monomers further having one or more substitutable leaving groups which can be removed by solvolysis wherein said substitutable leaving groups of each of said monomers are different from each other, selecting one or more monomers from a second group II, containing one or more ethylenically unsaturated monomers without a substitutable leaving group polymerizing the monomers selected above in the presence of a cross-linking agent to form a cross-linked, polymer composition;

solvolyzing and hydrating the polymer prepared above;

wherein the ratio of said two or more monomers of the first group I relative to each other and to the one or more monomers of the second group II is adjusted such that during solvolysis and hydration, the polymer undergoes a controlled volume change of between a shrinkage of 20% and an expansion of 40%, and further wherein the quantity by weight of each monomer present in the polymer being chosen so that the monomers of the first group I are in the range of from 5 to 95% by weight of the polymer and monomer(s) of the second group II is (are) in the range of from 5 to 95% by weight of the polymer.

2. A contact lens as claimed in claim 1 in which any monomer used in the first group is selected from monomers with the general formula in which $R_x{}^L$ represents the group which may be removed by solvolysis:

$$CH_2=C(R^1)-Y-R_x{}^L$$

where $R^1=$ —H, —alkyl or —substituted alkyl groups, $R_x{}^L$

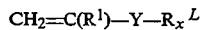

$Y=$ —$(CH_2)_k$—, —(Ar)— or —substituted (Ar)—, —$COO(CP_2)_l$—$(CR^2R^3)_m$—$(CP_2)_n$—;

P= —H, —alkyl or —substituted alkyl groups, —halo (chloro, bromo, iodo) groups, —(Ar) or —substituted (Ar)—;

$R^2, R^3=$ —H, —$CH_2$— or

—$OCO(CP_2)_j$—$CP_3$;

$R_x{}^L=$ —$OCOCF_3$, —$OCOCCl_3$, —$OCOCBr_3$, —O—Si[$(CP_2)_k$—$CP_3$,]$_3$, —$OSO_3$—$CH_3$, and —$OSO_3$—Ar—$CH_3$ or chloroacetyl dichloroacetyl, trichloroacetyl, fluoroacetyl, methoxyacetyl, triphenylmethoxyacetyl, phenoxyacetyl, trimethysilyl, triethylsilyl, isopropyldimethylsilyl, t-butyldimethylsilyl, methyldiisopropylsilyl, tribenzylsilyl, triphenylsilyl, cyclic ketals, cyclic orthoesters formed from methoxy methylene, ethoxymethylene, 1-(N,N-dimethylamino)ethylidene derivatives, 1-(N,N-dimethylamino)benzylidene derivatives, and methanesulfonate and toluenesulfonates and wherein k= is an integer between 0 and 16 l, m, n are 0 or an integer of at least 1 provided that j+m+n is greater or equal to 2 but less or equal to 16; and x is functionally dependent on Y.

3. A contact lens as claimed in claim 2, in which k has a value between 0 and 6.

4. A contact lens as claimed in claim 2, in which j, m, n have values between 0 and 6.

5. A contact lens as claimed in claim 2 in which $R_x{}^L$ is selected from the group consisting of easily hydrolyzable groups.

6. A contact lens as claimed in claim 1, in which the article is a contact lens and the monomer selected for the second group (II) is selected from the group consisting of methyl methacrylate, trifluoromethyl methacrylate, hydroxymethyl methacrylate, 2′,2′,2′-trifluoroethyl methacrylate, hydroxyethyl methacrylate, and dimethyl acrylamide.

7. A contact lens as claimed in claim 6, in which the monomer selected for the second group (II) is selected from the group consisting of methyl methacrylate and 2′,2′,2′-trifluoroethyl methacrylate.

8. A contact lens as claimed in claim 1 in which the first group monomers are 1,3-bis-(trichloroacetoxy)propyl -2-methacrylate and 1,3-bis-(trifluoroacetoxy)propyl -2-methacrylate.

9. A contact lens as claimed in claim 1 in which the first group monomers are 1,3-bis-(trimethylsilyl)propyl -2-methacrylate and 1,3-bis-(trifluoroacetoxy)propyl-2-methacrylate.

10. A contact lens as claimed in claim 1 in which the first group monomers are 1,3-bis-(t-butyldimethylsilyl)-propyl-2-methacrylate and 1,3-bis-(trifluoroacetoxy)-propyl-2-methacrylate.

11. A contact lens claimed in claim 1 in which the first group monomers are 1,3-bis-(trichloroacetoxy)propyl-2-methacrylate and methyl-α-(trifluoroacetoxy)acrylate.

12. A contact lens as claimed in claim 1 in which the first group monomers are (2'-trichloroacetoxy)ethyl methacrylate and methyl -α-(trifluoroacetoxy)acrylate.

13. A contact lens as claimed in claim 1 in which the first group monomers are (2'-trichloroacetoxy)ethyl methacrylate and methyl -α-(trifluoroacetoxy)acrylate.

14. A contact lens as claimed in any of claims 11-13, in which the ratio of the quantity by weight of the two monomer groups I and II are used to form the co-polymer ranges from 19:1 to 1:19.

15. A contact lens as claimed in claim 1, in which the monomer of the first group is formed by one of the following syntheses:

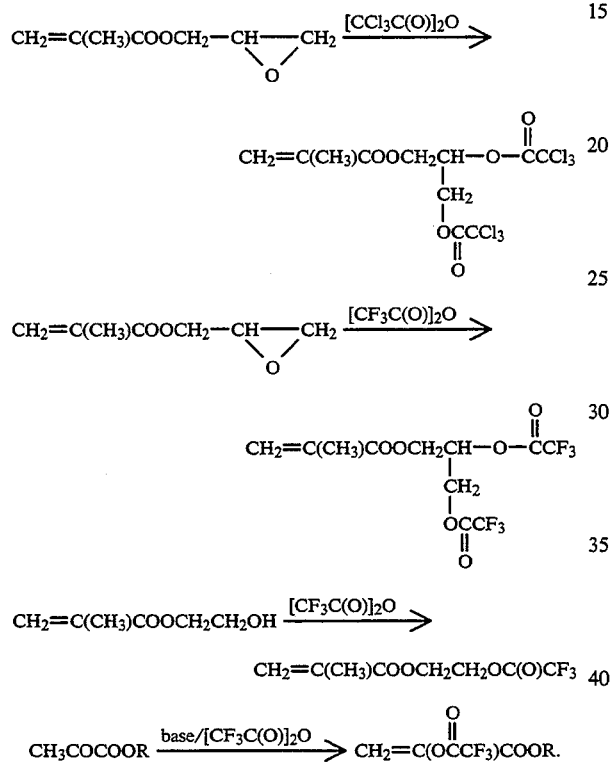

16. A composite contact lens comprising a rigid oxygen permeable center portion surrounded by a soft hydrophilic peripheral skirt which is a hydrogel having a cross-linked structure and which contains water in the range of from 5 to 95% by weight, which hydrogel is formed by the process which comprises:

selecting two or more monomers from a first group I, said monomers having an ethylenically unsaturated group and each of said monomers further having one or more substitutable leaving groups which can be removed by solvolysis wherein said substitutable leaving groups of each of said monomers are different from each other, selecting one or more monomers from a second group II, containing one or more ethylenically unsaturated monomers without a substitutable leaving group polymerizing the monomers selected above in the presence of a cross-linking agent to form a cross-linked, polymer composition;

solvolyzing and hydrating the polymer prepared above;

wherein the ratio of said two or more monomers of the first group I relative to each other and to the one or more monomers of the second group II is adjusted such that during solvolysis and hydration, the polymer undergoes a controlled volume change of between a shrinkage of 20% and an expansion of 40%, and further wherein the quantity by weight of each monomer present in the polymer being chosen so that the monomers of the first group I are in the range of from 5 to 95% by. Weight of the polymer and the monomer(s) of the second group II is (are) in the range of from 5 to 95% by weight of the polymer.

17. A composite contact lens comprising a rigid oxygen permeable portion and a soft hydrogel portion having a cross-linked structure and which contains water in the range of from 5 to 95% by weight, which hydrogel is formed by the process which comprises:

selecting two or more monomers from a first group I, said monomers having an ethylenically unsaturated group and each of said monomers further having one or more substitutable leaving groups which can be removed by solvolysis wherein said substitutable leaving groups of each of said monomers are different from each other, selecting one or more monomers from a second group II, containing one or more ethylenically unsaturated monomers without a substitutable leaving group polymerizing the monomers selected above in the presence of a cross-linking agent to form a cross-linked, polymer composition;

solvolyzing and hydrating the polymer prepared above;

wherein the ratio of said two or more monomers of the first group I relative to each other and to the one or more monomers of the second group II is adjusted such that during solvolysis and hydration, the polymer undergoes a controlled volume change of between a shrinkage of 20% and an expansion of 40%, and further wherein the quantity by weight of each monomer present in the polymer being chosen so that the monomers of the first group I are in the range of from 5 to 95% by weight of the polymer and monomer(s) of the second group II is (are) in the range of from 5 to 95% by weight of the polymer.

* * * * *